Patented July 19, 1949

2,476,679

UNITED STATES PATENT OFFICE 2,476,679

PRODUCTION OF p,p'-DIHYDROXY-3,4-DIPHENYLHEXANE OF MESOID FORM

Henri Morren, Forest-Brussels, Belgium

No Drawing. Application August 29, 1946, Serial No. 693,806. In Belgium October 18, 1945

4 Claims. (Cl. 260—619)

It is known to obtain by dehydration of p,p'-dimethoxy - 3,4-diphenyl-n-hexane-3(4)-ol a mixture of the cis and trans forms of p,p'-dimethoxy-3,4-diphenylhexene from which the trans form of melting point 123–125° C. can be separated in crystallised state by means of a suitable solvent. The mother liquor contains liquid forms, mainly the cis form together with other ethylene derivates.

It is also known to subject the liquid forms containing the cis form to stereomutation repeated several times and thus to obtain the trans compound with an output more than doubled, or trebled, as compared with that obtained by simple crystallisation of the trans compound contained in the mixture of stereoisomers. The total output of trans compounds then is of the order of 70 to 80%.

It is further known to convert the trans compound of melting point 123–125° C. by demethylation into p,p'-dihydroxy-diethylstilbene.

I have now found that the liquid forms containing mainly the cis form can advantageously be used as starting material for the production of p,p'-dihydroxy-3,4-diphenylhexane of melting point 186–187° C. This compound has valuable therapeutical properties, whereas its isomer of melting point 128° C. is biologically of little activity.

According to the present invention, p,p'-dimethoxy-diphenylhexene, such as exists for example in the liquid forms arising from the dehydration of p,p' - dimethoxy-3,4-diphenyl-n-hexane-3(4)-ol, is subjected to hydrogenation in presence of Raney nickel and an ester of a fatty acid with 1 to 5 carbon atoms as solvent. There is formed a dimethoxy derivative of melting point 141–142° C. which is converted by saponification into p,p'-dihydroxy-3,4-diphenylhexane of mesoid form of melting point 186–187° C.

I have ascertained that the solvent in which the hydrogenation is carried out has a decisive influence on the stereochemical structure of the compound obtained. Whereas in dioxane for example I obtain practically only the derivative of melting point 56° C., I obtain a preponderant amount of the compound of melting point 141–142° C. when the reduction is carried out in an ester of a fatty acid with 1 to 5 carbon atoms. This explains the fact that until now the hydrogenation with Raney nickel has not been considered applicable to the production of the p,p'-dihydroxy - 3,4 - diphenylhexane of melting point 186–187° C.

Example I

In 400 volumes of ethyl acetate, dissolve 93 parts of the residue of evaporation of mother liquor rich in p,p'-dimethoxy-3,4-diphenylhexene of cis form. Add to this solution 15 parts of Raney nickel and transfer it to a revolving autoclave into which is introduced hydrogen under pressure of 140 to 150 kg/cm². The apparatus is rotated for 3 hours at ordinary temperature and then for 3 hours at about 100° C.

After cooling the Raney nickel is filtered and washed with hot benzene to dissolve any organic substance. The filtrate is evaporated in vacuo and the dry residue is dissolved in as many parts by volume of hot benzene as there are parts by weight of dry residue. The latter is dissolved at high temperature and methyl alcohol (10 times the volume of benzene used) is added. Crystallisation takes place while stirring until the mass has cooled down to about 10° C., the crystals are centrifuged and washed with methyl alcohol. After drying there are obtained about 60 parts of p,p' - dimethoxy-3,4-diphenylhexane of melting point 141–142° C.

The product thus obtained is of sufficient purity to undergo a demethylation treatment by any known method. For instance by saponification with alcoholic potash it is possible to obtain easily from 60 parts of the product of melting point 141–142° C., 50 parts of p,p'-dihydroxy-3,4-diphenylhexane (mesoid form) of melting point 186–187° C.

Example II

The above described operations have been carried out with dioxane as a solvent instead of ethyl acetate. The p,p'-dimethoxy-3,4-diphenylhexane obtained was the compound of melting point 56° C. which, after demethylation gives the p,p'-dihydroxy-3,4-diphenylhexane (racemic form) of melting point 128° C.

I claim:

1. In a process of preparing p,p-dihydroxy-3,4-diphenylhexane of mesoid form having a melting point of 186–187° C. from p,p'-dimethoxy-3,4-diphenylhexene in a form obtainable by dehydration of p,p'-dimethoxy-3,4-diphenyl-n-hexane-3(4)-ol, the steps of subjecting the said p,p'-dimethoxy-3,4-diphenylhexene to hydrogenation in the presence of Raney nickel and of ethyl acetate as solvent and then subjecting the product of said hydrogenation to demethylation in known manner.

2. In a process of preparing p,p'-dihydroxy- 3,4-diphenylhexane of mesoid form having a melting point of 186–187° C. from p,p'-dimethoxy-3,4-diphenylhexene, dissolving said p,p'-dimethoxy-3,4-diphenylhexene in ethyl acetate, subjecting the solution to hydrogenation in the presence of Raney nickel thereby producing p,p'-dimethoxy-3,4-diphenylhexane of melting point 141–142° C. and subjecting the latter to demethylation in known manner.

3. In a process of preparing p,p'-dihydroxy-3,4-diphenylhexane of mesoid form having a melting point of 186–187° C. from liquid forms of p,p'-dimethoxy-3,4-diphenylhexene, the steps of subjecting the p,p'-dimethoxy-3,4-diphenylhexene to hydrogenation in the presence of Raney nickel and of ethyl acetate as solvent, and then subjecting the product of said hydrogenation to demethylation in known manner.

4. In a process of preparing p,p'-dihydroxy-3,4-diphenylhexane of mesoid form having a melting point of 186–187° C. from liquid forms of p,p'-dimethoxy-3,4-diphenylhexene of cis form, dissolving said p,p'-dimethoxy-3,4-diphenylhexene in ethyl acetate, subjecting the solution to hydrogenation in the presence of Raney nickel thereby producing p,p'-dimethoxy-3,4-diphenylhexane of melting point 141–142° C., and subjecting the latter to demethylation in known manner.

HENRI MORREN.

REFERENCES CITED

The following references are of record in the file of this patent:

UNITED STATES PATENTS

| Number | Name | Date |
|---|---|---|
| 2,350,718 | Bretschneider | June 6, 1944 |
| 2,357,985 | Wallis et al. | Sept. 12, 1944 |
| 2,392,852 | Kharasch | Jan. 15, 1946 |
| 2,400,033 | Tallman et al. | May 7, 1946 |
| 2,400,034 | Tallman | May 7, 1946 |